C. B. GOODSPEED.
CAR TRUCK FRAME.
APPLICATION FILED FEB. 19, 1909.
929,300.
Patented July 27, 1909.
3 SHEETS—SHEET 2.
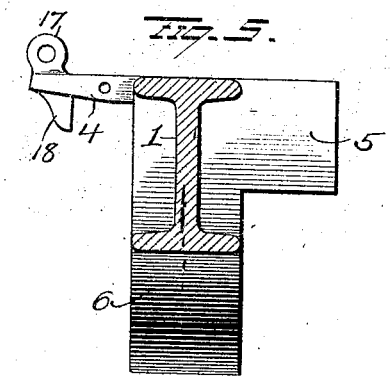
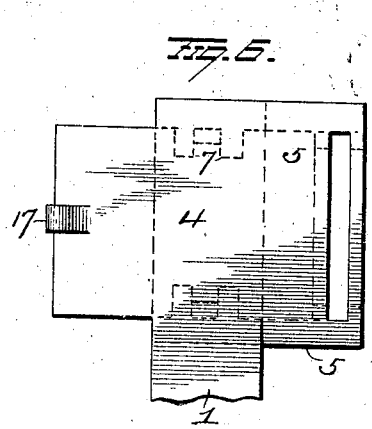
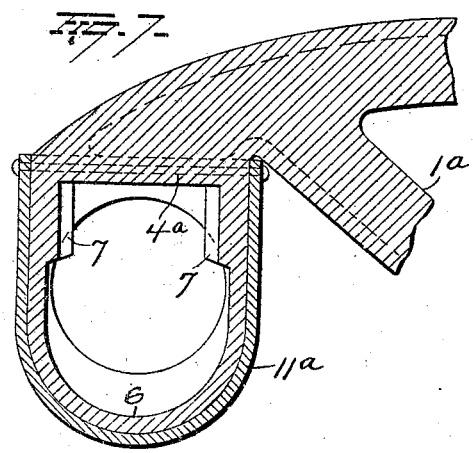
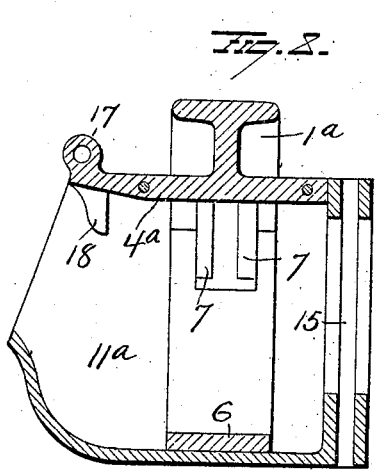
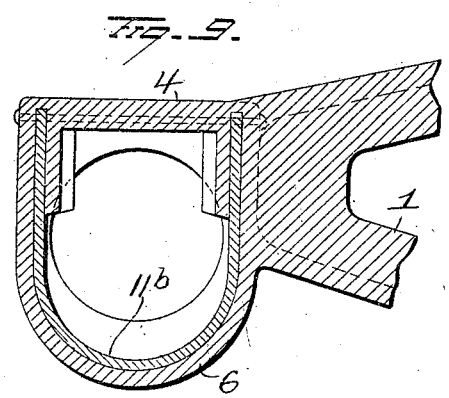
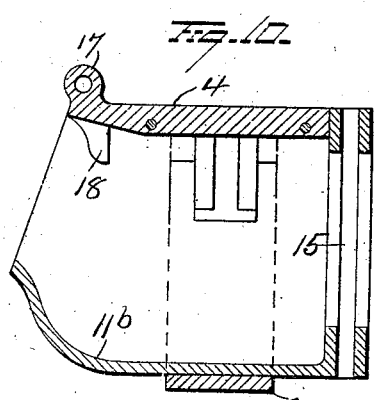
WITNESSES
INVENTOR
C. B. Goodspeed
By H. A. Seymour
Attorney C. B. GOODSPEED.
CAR TRUCK FRAME.
APPLICATION FILED FEB. 19, 1909.
929,300.
Patented July 27, 1909.
3 SHEETS—SHEET 3.
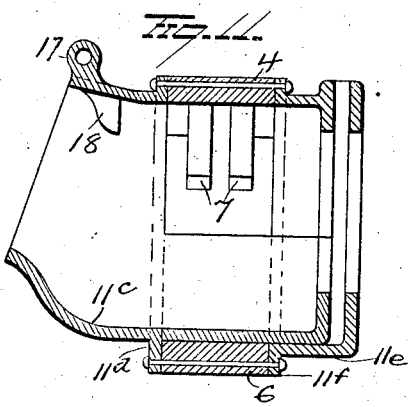
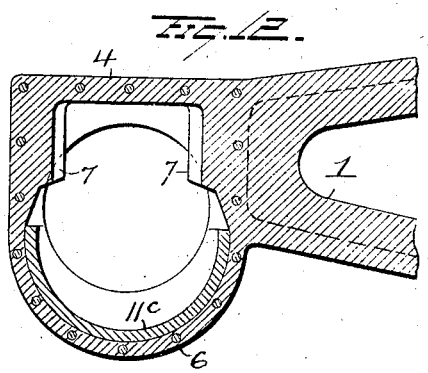
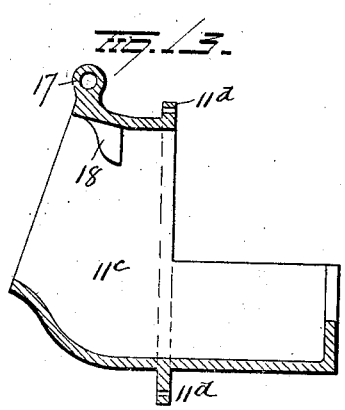 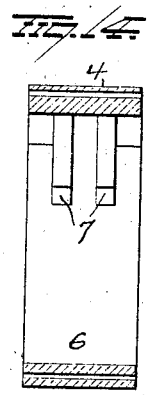 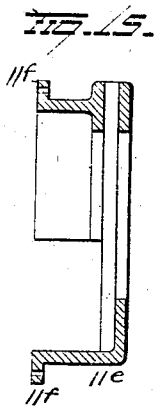
WITNESSES
INVENTOR
C. B. Goodspeed
By H. A. Seymour
Attorney

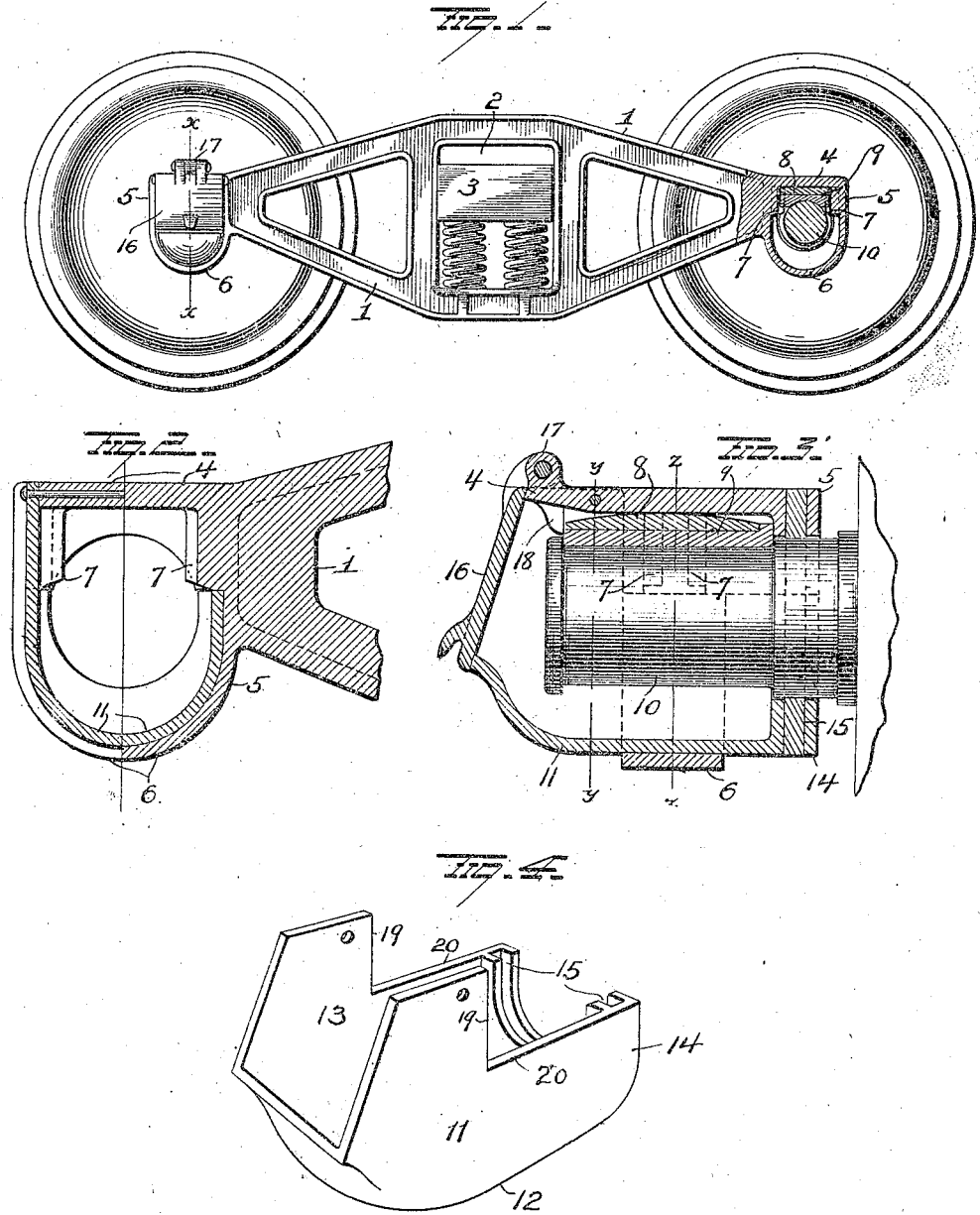

UNITED STATES PATENT OFFICE.

CHARLES B. GOODSPEED, OF COLUMBUS, OHIO.

CAR-TRUCK FRAME.

No. 929,300.　　　　Specification of Letters Patent.　　　Patented July 27, 1909.

Application filed February 19, 1909. Serial No. 478,887.

*To all whom it may concern:*

Be it known that I, CHARLES B. GOODSPEED, of Columbus, in the county of Franklin and State of Ohio, have invented certain new and useful Improvements in Car-Truck Frames; and I do hereby declare the following to be a full, clear, and exact description of the invention, such as will enable others skilled in the art to which it appertains to make and use the same.

My invention relates to an improvement in car truck side frames and journal boxes for same, the object being to provide a construction whereby the weight and stresses are borne by the side frames, the boxes serving merely as coverings and holders for the lubricant and the dust guard.

A further object is to so construct the side frame and its boxes, that the parts which hold the axles in position, are integral with the side frame, thus taking all the strains from the boxes.

With these and other objects in view my invention consists in the parts and combination of parts and in the details of construction as will be more fully explained and pointed out in the claims.

In the accompanying drawings, Figure 1 is a view in side elevation of the truck, the box at one end of the frame being removed and the end of the frame shown in section. Fig. 2 is a view in section on the lines $y$—$y$ and $z$—$z$ of Fig. 3. Fig. 3 is a view in section lengthwise the bearing. Fig. 4 is a view in perspective of the box detached. Fig. 5 is a view in section through the side frame looking toward the bearing, the box removed. Fig. 6 is a plan view of same. Figs. 7 and 8, 9 and 10, and 11 and 12 are views in section of modifications and Figs. 13, 14 and 15 are views of parts of the construction shown in Figs. 11 and 12.

1 represents the integrally cast side frame consisting of an upper member, a lower member and two cross members, the latter constituting the columns for the bolster 3, the ends of which rest in the openings between the columns and are supported in the well known manner. Each end of the said side frame is provided with a journal bearing frame, comprising a top 4, sides 5 and a curved bottom 6, all cast integral with the side 1 of the truck frame. The top 4 of the frame is as shown in Fig. 6, the full width and length of the journal box, and forms the top of the latter, while the curved bottom 6 of the frame is a semi-circular continuation of the sides 5 at the front of the latter as shown in Fig. 5, the width of the bottom 6 being approximately the thickness of the side frame 1 of the truck. All these parts are cast integral, and the sides 5 are provided on their inner surfaces with the usual lugs 7 for carrying the wedges 8 and brasses 9, against which the axle 10 has direct bearing.

The box or housing 11 shown in Fig. 4, comprises a dish-shaped bottom 12 and sides 3, the latter being cut away at their upper rear ends, to conform to and register with the side 5 of the bearing frame as shown in dotted lines in Fig. 3, so that when the parts are assembled, the sides 5 of the frame, conform to and register with the sides of the body 11 of the box or housing thus forming a complete closure. The rear end 14 of the box is grooved as at 15 for the reception of a dust guard, and the open front end of the box is closed by a cover 16 hinged to the lug 17 integral with the top 4 of the bearing frame. The top 4 is also provided on its under side with the integral lug 18 which forms an abutment for the wedge 8 and brass 9.

The box 11 being dish-shaped and closed at its bottom, sides and part way its ends, form the container of the lubricant, and is so shaped externally as to fit within and conform to the bottom 6 of the bearing frame as shown in Figs. 2 and 3. This box or housing is introduced from the outer end of the bearing frame and is secured by rivets or bolts passing through the sides 13 of the box and into the top 4 of the bearing frame, the edges 19 and 20 of the box, formed by cutting away the upper rear ends of the latter, registering with the front and lower edge of the sides 5 of the frame.

With this construction it will be seen that the bearing frame, which as before explained is cast integral with the sides 1 of the truck takes all weight, while the box 11 simply forms a closure and lubricant receptacle.

In the construction above described the side frame of the truck is cast integral with the sides of the bearing frames.

In the construction shown in Figs. 7 and 8, the side frame 1ª of the truck, is formed integral with the top 4ª of the bearing or box carrying frame, and the box 11ª instead of fitting within the frame, is secured to the outer side thereof. In this construction the box extends back its full depth, the entire length of the bearing as shown in Fig. 8 and is not cut away at its ends as in the previous construction.

In Figs. 9 and 10 the box 11$^b$ is substantially identical with that shown in Figs. 7 and 8, but it fits within the bearing frame as in the construction first described, the sides of the frame being grooved as shown in Fig. 9 for the passage of the sides of the box. In this latter construction the box must be applied from the inner side of the side frame of the truck and is secured by bolts or rivets as in the previous construction.

In the construction shown in Figs. 11 to 14 inclusive the box is made of two sections, the outer section 11$^c$ of which is provided with a flange 11$^d$ adapted to bear against the outer face of the bearing frame. The lower half of this box is continuous from end to end forming an oil receptacle and passes through the bearing frame, and is underlapped at its rear or inner end by the section 11$^e$ which is provided with a flange 11$^f$ designed to abut against the rear face of the bearing frame, the two sections 11$^c$ and 11$^e$, forming when secured to the frame by bolts or rivets as shown, a complete box and closure for the bearing.

With these constructions, it will be seen that all the stresses are borne by side frames of the trucks, and not on the box, the latter serving simply as a closure for the bearing and as a receptacle for the lubricant.

By making the box separate from the bearing I greatly simplify and cheapen the cost of casting, and provide a construction in which parts most subject to strain are cast integral and in which the box which is the part most likely to be injured or destroyed, can be readily replaced.

It is evident that many slight changes might be resorted to in the relative arrangement of parts shown and described without departing from the spirit and scope of my invention hence I would have it understood that I do not wish to confine myself to the exact construction and arrangement of parts shown and described, but, Having fully described my invention what I claim as new and desire to secure by Letters-Patent, is:—

1. A car truck side frame comprising an upper member and lower member and two cross members, a frame surrounding the journal, a journal box top, a lug for attaching journal box lid and lugs for holding journal wedge and bearing, all cast integral, in combination with a detachable journal box and means for attaching same to frame.

2. A truck side frame, a frame surrounding the journal against which the journal wedge bears, with lugs for holding journal wedge and bearing, all cast integral, in combination with a detachable journal box and means for attaching same to frame.

3. A truck side frame, a frame surrounding the journal for carrying journal box, a journal box top against which journal wedge bears, provided with lug for attaching journal box lid and with lugs for holding journal wedge and bearing, all cast integral, in combination with a detachable journal box and means for attaching same to frame.

4. A truck side frame, a frame surrounding the journal and provided with lugs for holding wedge and bearing and a journal box top, all cast integral, in combination with a detachable journal box and means for attaching same to frame.

5. A truck side frame, a frame surrounding the journal and provided with lugs for holding journal wedge and bearing, a journal box top having lug for attaching lid and lugs for holding journal wedge and bearing, all cast integral, in combination with a detachable journal box and means for attaching same to frame.

In testimony whereof, I have signed this specification in the presence of two subscribing witnesses.

CHARLES B. GOODSPEED.

Witnesses:
J. C. WHITRIDGE,
A. H. THOMAS.